United States Patent [19]

Yamada et al.

[11] Patent Number: 4,522,479
[45] Date of Patent: Jun. 11, 1985

[54] FLASH APPARATUS WITH POWER SUPPLY CONTROL DEVICE

[75] Inventors: Masanori Yamada; Ryoichi Yoshikawa, both of Kanagawa, Japan

[73] Assignee: Canon Kabushiki Kaisha, Tokyo, Japan

[21] Appl. No.: 565,616

[22] Filed: Dec. 27, 1983

[30] Foreign Application Priority Data

Dec. 27, 1982 [JP] Japan .............................. 57-196728
Jan. 19, 1983 [JP] Japan ................................ 58-6119
Jan. 19, 1983 [JP] Japan ................................ 58-6120

[51] Int. Cl.³ ...................... G03B 15/05; H05B 41/26
[52] U.S. Cl. ................................. 354/413; 354/127.1; 354/145.1; 315/136; 315/241 P
[58] Field of Search ............ 354/413, 484, 126, 127.1, 354/127.11, 127.12, 145.1, 129, 289.1, 289.12; 315/129, 133–136, 241 P; 320/1

[56] References Cited

U.S. PATENT DOCUMENTS

| | | | |
|---|---|---|---|
| 3,738,239 | 6/1973 | Higuchi | 354/145.1 |
| 4,001,640 | 1/1977 | Biber | 354/145.1 X |
| 4,444,483 | 4/1984 | Nakajima | 354/145.1 X |

Primary Examiner—William B. Perkey
Attorney, Agent, or Firm—Toren, McGeady, Stanger

[57] ABSTRACT

Disclosed is a power supply control device which automatically cuts off power to a flash apparatus by turning off a power switch a predetermined time after the switch is turned on to prevent waste of electrical energy arising from careless failure to turn off the power switch. The power supply control device is provided with a timer circuit which sets the predetermined period of time and is arbitrarily resetable with a manually operable power switch.

20 Claims, 6 Drawing Figures

FLASH APPARATUS WITH POWER SUPPLY CONTROL DEVICE

BACKGROUND OF THE INVENTION

1. Field of the Invention

This invention relates to a flash apparatus for a camera and more particularly to a flash apparatus with a power supply control device having a timer circuit which automatically renders the flash apparatus inoperative after the lapse of a predetermined period of time (hereinafter called timer time) from the closing of a power switch to prevent waste of electric energy due to careless failure to turn off the power switch.

2. Description of the Prior Art

In a conventional fllash apparatus of thid kind, it has been impossible to reset the timer circuit without actually carrying out a photographic operation such as a flash.

SUMMARY OF THE INVENTION

It is an object of the present invention to provide a flash apparatus which permits extension of a timer time without necessitating any unnecessary photographic operation for that purpose.

The above and further objects and features of the invention will become apparent from the following detailed description of the preferred embodiments thereof taken in connection with the accompanying drawings.

DETAILED DESCRIPTION OF THE PREFERRED EMBODIMENTS

Figure 1:
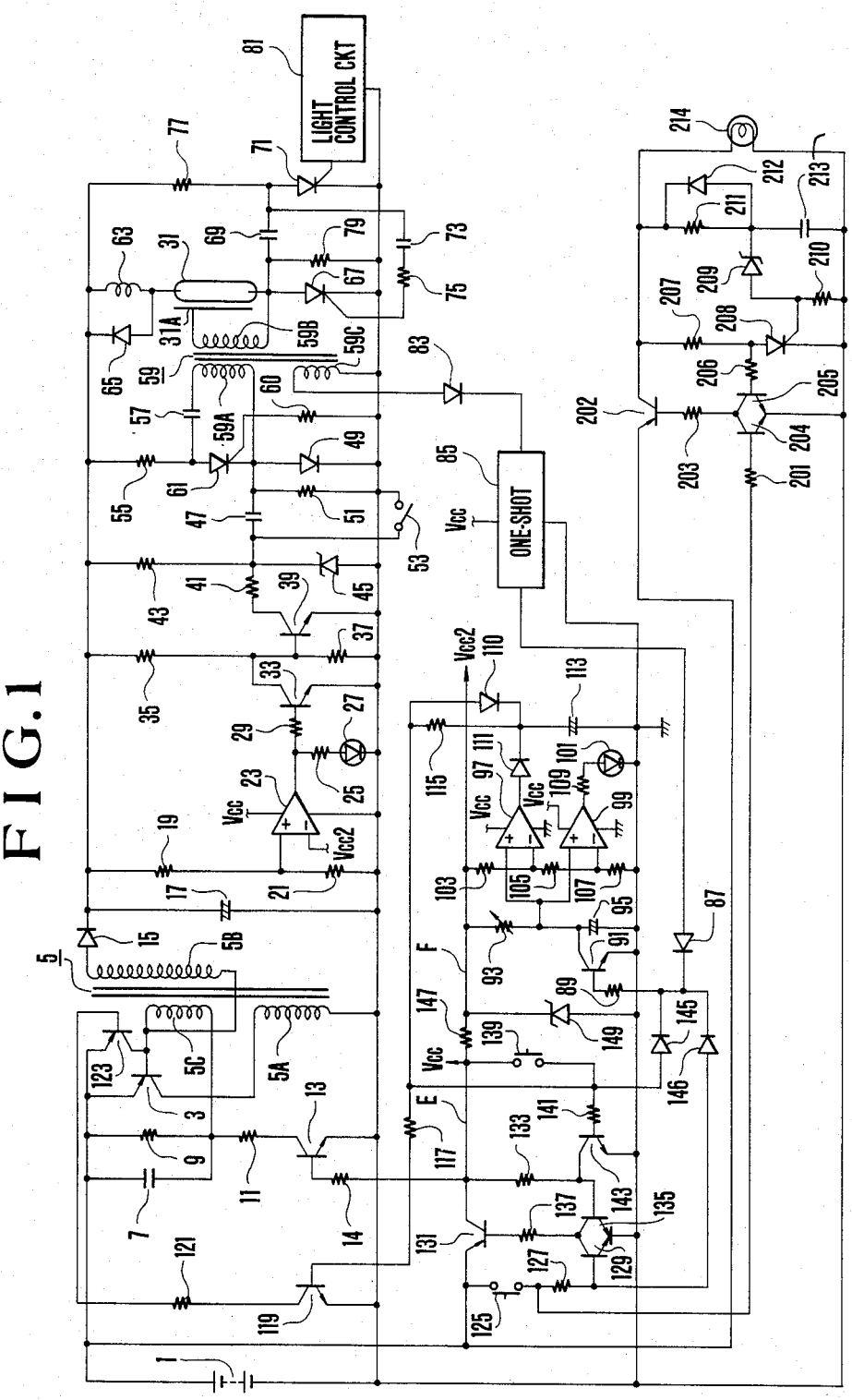
FIG. 1 is a circuit diagram showing a flash apparatus as an embodiment of the present invention.

FIG. 1 shows the electrical circuit arrangement of a flash apparatus embodying the present invention as an embodiment thereof. The circuit arrangement includes a power source battery 1. A series circuit composed of a pnp oscillation transistor 3 and a primary winding 5A of a boosting transformer 5 is parallel connected to the battery 1. A feedback winding 5C of the transformer 5 is connected to the base of the transistor 3. To the feedback winding 5C are connected a capacitor 7 and a resistor 9. An npn transistor 13 that serves for oscillation control is connected via a resistor 11 to the feedback winding 5C. A rectifying diode 15 is connected to a secondary winding 5B of the transformer 5. A main capacitor 17 is arranged to be charged with a high voltage current rectified by the diode 15. A DC-DC converter is formed by the above-stated elements 3-15. Resistors 19 and 21 which are arranged to form a voltage dividing circuit are parallel connected to the main capacitor 17. A node between these resistors is connected to the positive input terminal of a comparator 23. To the negative input terminal of the comparator 23 is connected a reference voltage Vcc2. When the charge voltage of the main capacitor 17 reaches a value sufficiently high for allowing a discharge tube 31 to flash, the output level of the comparator 23 becomes high to light up a light emitting diode 27 (hereinafter called LED for short) which is arranged to indicate completion of preparation for a flash. A resistor 25 is arranged to limit a current flow to the LED 27. An npn transistor 33 is connected via a base resistor 29 to the output terminal of the comparator 23. Resistors 35 and 37 form a voltage dividing circuit for supplying a drive voltage to the base of an npn transistor 39. The transistor 39 is provided with a collector resistor 41. A resistor 43 is provided for having a predetermined current flow to a Zener diode 45. A diode 49 is connected via capacitor 47 to the Zener diode 45. The cathode of the diode 49 is connected to the anode of the Zener diode 45. A reference numeral 51 denotes a resistor. A switch 53 is provided for test flashing. When a camera (not shown) is connected to the flash apparatus, a known synchronizing switch 53A (not shown) is parallel connected to this switch 53. A trigger capacitor 57 is connected via a resistor 55 to the output terminal of a DC-DC converter. This capacitor 57 is connected via a primary winding 59A of a trigger transformer 59 to a thyristor 61 which forms a trigger circuit.

A secondary winding 59B of the trigger transformer 59 is connected to the trigger electrode 31A of a xenon discharge tube 31. A resistor 60 is connected to the gate of the thyristor 61. A coil 63 is arranged to limit a discharge current flow to the discharge tube 31. A noise preventing diode is parallel connected to the coil 63. A known flash light quantity control circuit is formed by elements 67–81 including a main thyristor 67, a commutation capacitor 69, an auxiliary thyristor 71, a capacitor 73, a resistor 75, charging resistors 77 and 79 for the commutation capacitor 69 and a light control circuit 81 arranged to measure a reflection light coming from an object to be photographed (not shown) and to generate a flashing stop signal when the quantity of emitted flash light reaches a predetermined value required for giving an apposite exposure light quantity to a film. A monostable multivibrator 85 (hereinafter called a one-shot) is connected via a diode 83 to the auxiliary winding 59C of the trigger transformer 59. The output terminal of the one-shot 85 is connected via a diode 87 and a resistor 89 to the base of an npn transistor 91 which is arranged to reset a timer circuit consisting of a variable resistor 93 and a capacitor 95. The capacitor 95 of the timer circuit which determines the operating time of the flash apparatus is arranged to reach a predetermined voltage level, for example, 20 minutes after the start of the operation of the flash apparatus. Then, the output level of a comparator 97 changes from a low level (hereinafter called LL for short) to a high level (hereinafter called HL for short). Further, one minutes before the arrival of the capacitor 95 at the above-stated predetermined voltage level, the output of a comparator 99 changes from LL to HL to light up an LED 101 to give an advance notice of termination of the timer time of the timer circuit. The advance notice display element does not have to be a light emitting element but may be a sound producing element such as a piezo-electric buzzer. Resistors 103, 105 and 107 are provided for setting the inversion levels of the comparators 97 and 99. A resistor 109 is arrranged to limit a current flowing to the LED 101. The circuit arrangement further includes a diode 111; a capacitor 113; resistors 115 and 117 which are connected to the base of an npn transistor 119; a resistor 121 connected to the base of an npn transistor 123; and the oscillation controlling transistor 123 which is connected between the emitter and base of the transistor 3 and is arranged to stop the oscillation of the DC-DC converter in conjunction with the transistor 119. A normally open type power switch 125 is connected via a base resistor 127 to the base of a power supply control transistor 129. This switch 125 serves a combined function as a timer circuit reset switch. A pnp transistor 131 is arranged to control power supply to the timer circuit (93 and 95) and the display circuits 103, 105, 107, 99, 101, 109, etc. which are arranged to notify the photographer of approaching termination of a timer operation in advance. The collector of this transistor 131 is connected via a base resistor 133 to a power supply holding transistor 135 and also to a power supply line E. The power supply line E is arranged to produce a power source voltage Vcc for the comparator 23. The transistor 131 is provided with a base resistor 137. A normally open type switch 139 is connected via a base resistor 141 to the base of a power supply cut-off transistor 143. A diode 145 is connected via resistor 89 to the base of the transistor 91. A reference numeral 147 denotes a resistor. A Zener diode 149 has its output terminal connected to a power supply line F which is arranged to produce a reference voltage Vcc2 to be supplied to the negative input terminal of the comparator 23. Diodes 145 and 146 respectively have their anodes connected to the power switches 139 and 125 and their cathodes to the base of the transistor 91 via a resistor 89.

A transistor 202 has its emitter connected to the power source battery 1, the collector to a lamp 214 and its base to a resistor 203. The transistor 202 is thus arranged to control the voltage of power supply to the lamp 123 and to a lamp time control timer circuit consisting of a resistor 211 and a capacitor 213. A diode 212 is parallel connected to the resistor 211. A Zener diode 209 has its cathode connected to the anode of the diode 212 and its anode to the gate of an SCR 208. The SCR 208 is provided with a gate resistor 210. Npn transistors 204 and 205 have their collectors and emitters parallel connected and their collectors connected via the resistor 203 to the base of the transistor 202.

A resistor 201 is arranged to have one terminal thereof connected to the power switch 125 and the other terminal to the base of a transistor 204. Another resistor 206 has one terminal thereof connected to the base of the transistor 205 and the other terminal to the anode of the SCR 208. A lamp 214 is arranged to illuminate a photographic information display plate which will be described later herein. The lamp 214 has one terminal thereof connected to the collector of the transisotr 202 and the other terminal to the power source battery 1. An LED or the like may be used in place of the lamp as an auxiliary light source for the photographic information display plate.

Figure 2:
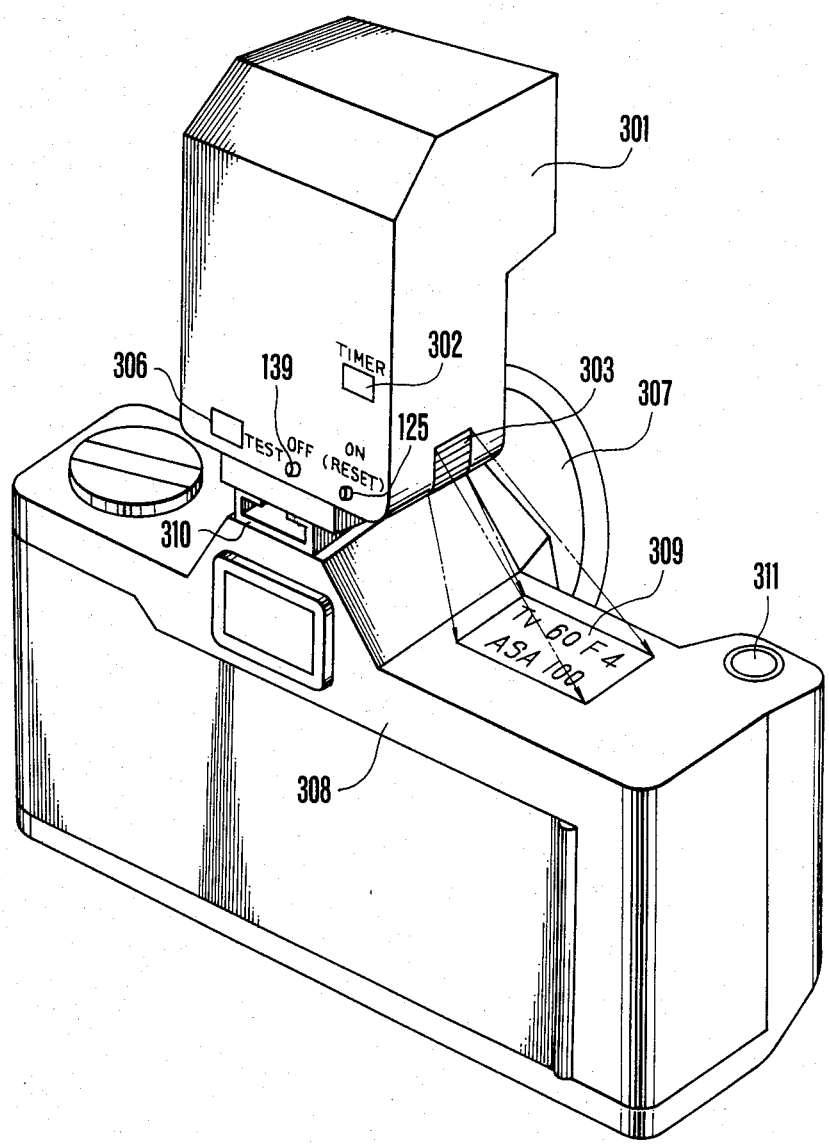
FIG. 2 is an oblique view showing the appearance of the flash apparatus of FIG. 1.

The structural arrangement of the flash apparatus of FIG. 1 is as roughly shown in FIG. 2. The illustration of FIG. 2 includes a body 301 of the flash apparatus; a display window 302 which is provided for observation of the display of the LED 101 which is shown in FIG. 1 and is arranged to give an advance notice with regard to the timer time; a light projecting window 303 which is provided for the illumination lamp 214 which is disposed inside thereof; the power switch 125 which is also shown in FIG. 1; another power switch 139 also shown in FIG. 1; and an observation window 306 provided for observation of the LED 27 which is shown in FIG. 1 and is arranged to indicate completion of preparation for flashing. The window 306 is arranged such that, when it is pushed, the test flashing switch 53 which is shown in FIG. 1 is closed thereby. The illustration of FIG. 2 further includes a photo-taking lens 307; a camera 308; a liquid crystal display plate 309 which is arranged to display flash photographic information such as shutter time, aperture values, etc.; an accessory shoe 310; and a shutter release button 311.

The operation of the flash apparatus which is arranged as described above will be described below with reference to FIGS. 1 and 2:

When the power switch 125 is closed with the flash apparatus which is arranged as shown in FIG. 1 mounted on the camera, the transistor 129 turns on. At the same time, the transistor 131 also turns on. With the transistor 131 turned on, a current flows via the resistor 133 to the base of the transistor 135 to cause it to turn on. With the transistor 135 thus turned on, if the power switch 125 is thereafter open by releasing it from its depressing position, the base current of the transistor 131 continues to flow through the resistor 137 and the transistor 135. Therefore, the transistor 131 is kept on. When the transistor 131 turns on, the voltage Vcc which is approximately equal to the output voltage of the power source battery 1 is produced to the power supply line E. This renders the comparator 23 and the one-shot 85, etc. operative. The transistor 13 turns on. Therefore, a base current of the transistor 3 flows via the feedback winding 5C of the boosting transformer 5 and the resistor 11. Then, the DC-DC converter consisting of the transistors 3 and 13, the boosting transformer 5, the capacitor 7, the resistors 9 and 11 and the diode 15, begins to perform an oscillating operation to charge the main capacitor 17. With the transistor 131 turned on, the voltage Vcc2 is produced via the resistor 147 to the power supply line F. This causes the timer circuits 93 and 95 to begin their counting operation. Meanwhile, with the power switch 125 close, transistors 204 and 202 turn on to cause the base current of the transistor 205 to flow via the resistors 207 and 206. As a result, the transistor 205 turns on and then the transistor 202 remains on even after the power switch 125 is allowed to open. With the transistor 202 turned on, the illuminating lamp 214 lights up. The timer circuit (211 and 213) begins to operate. As a result, the liquid crystal display plate 309 which is shown in FIG. 2 is illuminated by the lamp 214 to facilitate observation by the photographer of photographic information displayed on the display plate 309.

After that, when the charge voltage of the capacitor 213 reaches the sum of the voltage of the Zener diode 209 and the voltage between the gate and cathode of SCR 208, the SCR 208 turns on. The base voltage of the transistor 205 drops to turn off the transistor 205. At the same time, the transistor 202 also turns off to put out the light of the lamp 214.

The lighting period of the lamp 214 which is defined by the timer circuit (211 and 213) is arranged to be sufficiently long for enabling the photographer to see the photographic information displayed on the display plate 309. For example, the lamp 214 is allowed to be alight over a period of about 10 sec.

When the light of the lamp 214 is put out, the diode 212 quickly discharges the electric charge of the capacitor 213 via the lamp 214 to ready the lamp for a next illuminating action.

After the commencement of the operation of the DC-DC converter as mentioned above, when the charge voltage of the main capacitor 17 reaches a predetermined value, the output level of the capacitor 23 changes to HL. The LED 27 for display of a flashing preparation completed state comes to light up. The transistor 33 turns on. The transistor 39 turns off. The trigger capacitor 47 begins to be charged via the resistor 43. The trigger circuit which consists of the resistors 43, 51 and 55, the Zener diode 45, the capacitors 47 and 57, the thyristor 61, the diode 49 and the transformer 59, then becomes operative.

Following that, when a synchronizing switch (not shown) is closed with the shutter (not shown) of the camera opened, the above-stated trigger circuit operates. A high voltage is produced at the secondary winding 59B of the trigger transformer 59. The xenon discharge bute 31 is ionized. A pulse voltage develops at the auxiliary winding 59C of the transformer 59 to trigger the one-shot 85. With the xenon discharge tube 31 ionized, the known trigger circuit which is composed of the capacitor 73 and the resistor 75 causes the thyristor 67 to turn on. The electric charge accumulated at the main capacitor 17 is discharged through the coil 63, the discharge tube 31 and the thyristor 67. The tube 31 begins to flash and illuminate an object (not shown) to be photographed.

Then, the flash's light reflected by the object is measured by the light control circuit 81. When the quantity of the reflected light reaches a predetermined value, the light control circuit 81 produces a flashing stop signal in a known manner and the discharge of main capacitor 17 is stopped in a known manner so that the film (not shown) can be exposed to light to a correct degree.

Meanwhile, when the pulse voltage is impressed on the input terminal of the one-shot 85 as mentioned in the foregoing, the output level of the one-shot 85 is kept at HL for a predetermined period of time. The transistor 91 short-circuits the time counting capacitor 95 of the timer circuit for a given length of time determined by the output of the one-shot 85. The electric charge accumulated at the capacitor 95 is thus discharged and the timer circuit is reset into its initial state. After that, when the output level of the one-shot 85 again changes to LL, the transistor 91 turns off to release the capacitor 95 from a short-circuited state. The timer circuit again begins to perform a time counting operation. In other words, the timer circuit is reset by the synchronizing switch 53A or the test switch 53.

If the camera system is left in this state, the timer circuit continuously operates. When the timer circuit operation comes to a point about one minutes before the expiration of the preset timer time (in this particular instance, the timer time determined by the variable resistor 93 and the capacitor 95 is 20 minutes), the output level of the comparator 99 changes to HL. The HL output of the comparator 99 causes the LED 101 to light up to give advance notice to the photographer that the time set at the timer circuit will soon come to an end.

After the lapse of the timer time, when the output level of the comparator 97 changes from LL to HL, the capacitor 113 is charged through the diode 111. The charge voltage of the capacitor 113 causes the transistor 119 to turn on. The transistor 123 also turns on. The transistor 3 turns off. The DC-DC converter then ceases its oscillation. Further, with the capacitor 113 charged as mentioned, a base current flows to the base of the transistor 143 via the resistors 115 and 141. The transistor 143 turns on. The transistor 135 turns off. Then, the base current flowing to the base of the power supply transistor 131 is cut off. This causes the transistor 131 to turn off. Since the collector voltage of the transistor 131 then approaches nought, the transistor 13 turns off to prevent the oscillation of the DC-DC converter from being resumed. As a result, the power of the battery automatically is no longer consumed at this time, so that electrical energy is not wasted by inadvertent failure to turn off the power switch.

Further, with the transistor 131 turned off, power supply to the power supply lines E and F is cut off. Therefore, the light of the LED 101 is put out. The LED 27 is also extinguished as power supply to the comparator 23 also comes to a stop.

The transistor 33 turns off at the same time as the power supply to the comparator 23 comes to a stop. The transistor 39 then turns on to discharge the electric charge of the capacitor 47. This renders the trigger circuit for the discharge tube 31 inoperative.

The inversion of the comparator 97 causes the capacitor 113 to be charged as mentioned above. The charge voltage of the capacitor 113 causes the transistor 91 to turn on as a base current flows there via the resistor 115 and the diode 145. With the transistor 91 thus turned on, the electric charge of the capacitor 95 is discharged to reset the timer circuit to its initial state.

In this specific embodiment, as mentioned above, the LED 101 lights up one minutes before the end of the timer time to inform the photographer of the approaching end of the timer time. Then, if the power switch 125 is again closed when the LED 101 lights up or for the purpose of reading the photographic information displayed on the liquid display plate 309, the lamp 214 comes to light up and remains alight for a predetermined period of time as mentioned in he foregoing. Then, a base current flows from the battery 1 to the base of the transistor 91 via the power switch 125, the resistor 127, the diode 146 and the resistor 89. The transistor 91 turns on. The electric charge of the time counting capacitor 95 is discharged. The timer circuit (93 and 95) is reset to its initial state. After that, when the power switch 125 is opened with the switch released from the depressing operation thereon, the flow of the base current of the transistor 91 is cut off. Therefore, the transistor 91 turns off. The charging process on the capacitor 95 is resumed. Again the timer circuit begins to operate. Therefore, after the power switch 125 is operated for continuation of the operation of the flash apparatus or for reading the photographic information, the DC-DC converter continues to operate unitl the end of the timer time. If the power switch 125 is again operated then, the flash apparatus of course further continues to operate in the same manner as mentioned above.

As described in the foregoing, with the power switch 125 opened, if the switch 139 is closed after the DC-DC converter is actuated together with the timer circuit, the capacitor 113 is rapidly charged, via the diode 110, up to a predetermined value. In this instance also, the resulting operation is the same as the above-stated operation which takes place after the inversion of the output level of the comparator 97 from LL to HL. Then, the operation of the DC-DC converter comes to a stop. Power supply to the timer circuit also comes to a stop. The electric charge of the time counting capacitor 95 is discharged, the light of the flashing preparation completion display LED 27 is put out and the trigger circuit for the discharge tube becomes inoperative.

In this embodiment, therefore, wasteful consumption of electrical energy can be prevented when the power switch is forgotten and not turned off. This lengthens the life of the battery. Another advantage of the embodiment resides in the following: When the display of the photographic information is illuminated, the timer circuit which prevents the power switch from being forgotten and not cut off is reset without fail. This arrangement gives a sufficient period of time between confirmation of the photographic information and the end of the operation of the flash apparatus, so that flash photography at night or under a dark condition can be reliably carried out.

Figure 3:
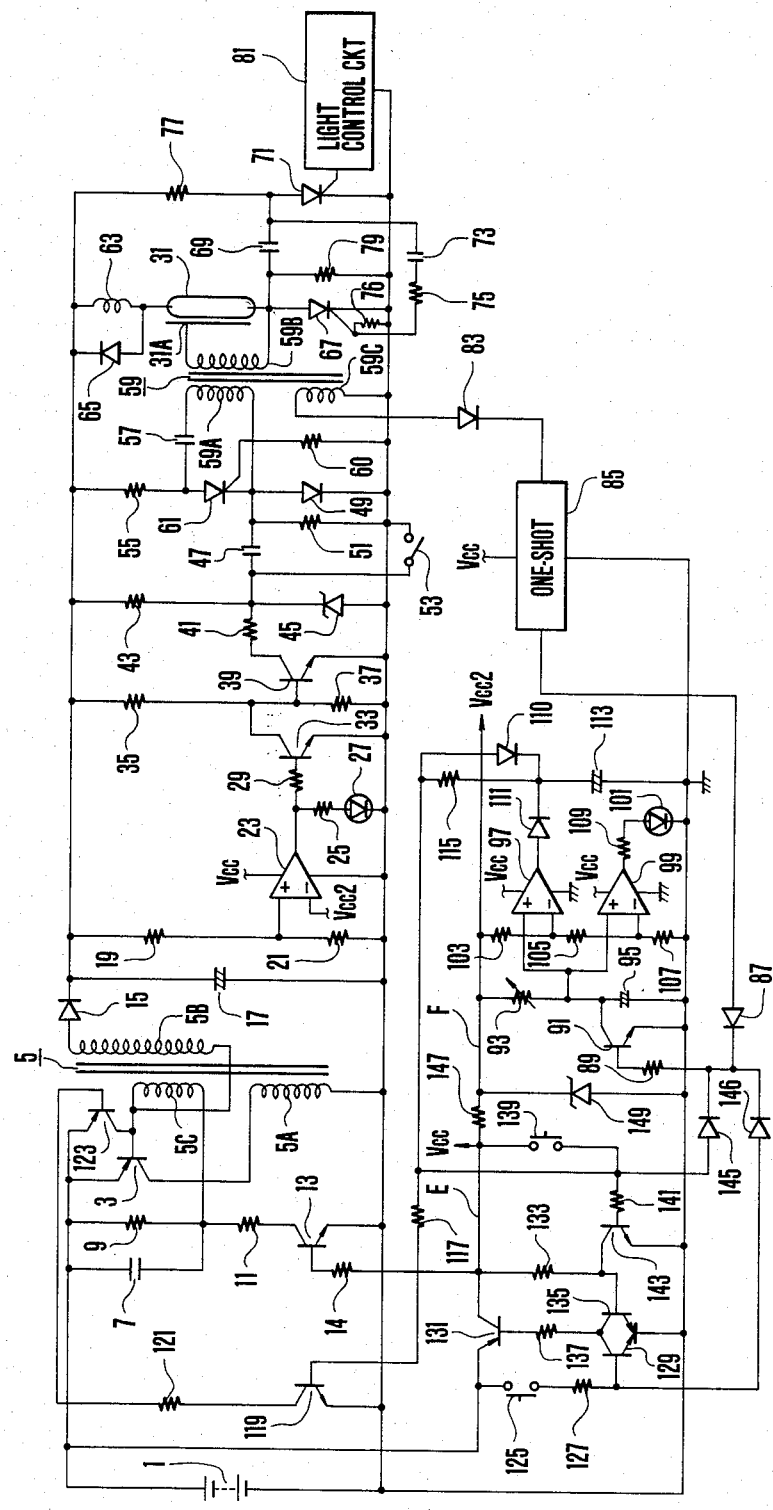
FIG. 3 is a circuit diagram showing a flash apparatus as another embodiment of the invention.

FIG. 3 shows the circuit arrangement of a flash apparatus as a second embodiment of the invention. The second embodiment is arranged in almost the same manner as the first embodiment which has been described in the foregoing. Therefore, by omitting the description of the arrangement of the second embodiment, the operation thereof alone will be described below:

When the power switch 125 is closed with the flash apparatus of FIG. 3 mounted on a camera (not shown), the transistor 129 turns on. At the same time, the transistor 131 also turns on. With the transistor 131 turned on, a current flows via the resistor 133 to the base of the transistor 135 to cause the transistor 135 to turn on. Therefore, after that, even with the power switch 125 released from a depressing operation thereof to open it, the base current of the transistor 131 continues to flow via the resistor 137 and the transistor 135. The transistor 131 thus remains on. With the transistor on, a voltage Vcc which is about equal to the output voltage of the power source battery 1 is produced to the power supply line E. This renders the comparator 23 and the one-shot 85 operative. Further, the transistor 13 also turns on. Therefore, a base current flows to the transistor 3 via the feedback winding 5C of the boosting transformer 5 and the resistor 11. As a result, the DC-DC converter which consists of the transistors 3 and 13, the boosting transformer 5, the capacitor 7, the resistors 9 and 11 and the diode 15, begins to perform an oscillating operation. The main capacitor 17 begins to be charged. Further, with the transistor 131 turned on, a voltage Vcc2 is produced via the resistor 147 to the power supply line F. Therefore, the timer circuit (93 and 95) begins to perform a time counting operation.

When the charge voltage of the main capacitor 17 reaches a predetermined value, the output level of the comparator 23 changes to HL. The flashing preparation completion display LED 27 lights up. The transistor 33 turns on. The transistor 39 turns off. A charging process on the trigger capacitor 47 begins via the resistor 43. The trigger circuit which consists of the resistors 43, 51 and 55, the Zener diode 45, the capacitors 47 and 57, the thyristor 61, the diode 49 and the transistor 59, then becomes operative.

Following that, when a synchronizing switch (not shown) is closed as a result of opening of a shutter (not shown) of a single-lens reflex camera, the above-stated trigger circuit comes to operate. A high voltage is produced at the secondary winding 59B of the trigger transformer 59. The xenon discharge tube 31 is ionized. A pulse voltage develops at the auxiliary winding of the transformer to trigger the one-shot 85. With the xenon discharge tube 31 ionized, the known trigger circuit which consists of the capacitor 73 and the resistor 75 turns the thyristor 67 on. The electric charge accumulated at the main capacitor 17 is discharged via the coil 63, the discharge tube 31 and the thyristor 67. The discharge tube 31 begins to flash to illuminate an object to be photographed (not shown).

The light reflected by the object is measured by the light control circuit 81. When the quantity of the light thus received reaches a predetermined value, the light control circuit 81 produces a flashing stop signal in a known manner to stop the main capacitor 17 from flashing in a known manner, so that the film (not shown) can be exposed to light to an appropriate degree.

When the pulse voltage is impressed on the input terminal of the one-shot 85 as mentioned above, the output of the one-shot 85 remains at HL for a predetermined period of time. The transistor 91 then short-circuits the capacitor 95 for the time counting of the timer circuit for a given period of time determined by the output of the one-shot 85. The electric charge accumulated at the capacitor 95 is then discharged to reset the timer circuit into its initial state. After that, when the output level of the one-shot 85 again changes to LL, the transistor 91 turns off to release the capacitor 95 from the short-circuited state. The timer circuit then once again begins to perform its time counting operation. In other words, the timer circuit is reset by the operation of either the synchronizing switch 53A or the test switch 53. The timer circuit continuously operates if the camera system is left in that state. Then, when the timer circuit operation comes to a point about one minutes before the end of the timer time (which is 20 minutes as determined by the variable resistor 93 and the capacitor 95 in this instance), the output level of the comparator 99 becomes HL. Then, the LED 101 lights up to inform the photographer of the approaching end of the period of time set at the timer circuit.

When the output level of the comparator 97 changes from LL to HL after the lapse of the timer time, the capacitor 113 is charged via the diode 111. The charge voltage of the capacitor 113 then causes the transistor 119 to turn on. The transistor 123 also turns on. The transistor 3 turns off. The DC-DC converter then stops oscillating. Further, with the capacitor 113 charged as mentioned above, a base current flows via the resistors 115 and 141 to the base of the transistor 143 to turn on the transistor. The transistor 135 then turns off to cut off the base current flowing to the base of the power supply transistor 131. The transistor 131 then turns off. Therefore, the collector voltage comes near to nought. The transistor 13 turns off. The DC-DC converter then does not resume its oscillating operation. The power of the battery thus automatically comes, at that point of time, to be no longer consumed. The power of the battery, therefore, can be prevented from being wasted by an inadvertent failure to cut off the power switch.

Since power supply to the power supply lines E and F is cut off with the transistor 131 turned off, the light of the LED 101 is put out. Power supply to the comparator 23 also comes to a stop to put out also the light of the LED 27. Further, the transistor 27 also turns off concurrently with discontinuation of power supply to the comparator 33. The transistor 39 turns on. The electric charge of the capacitor 47 is discharged to render the trigger circuit for the discharge tube 31 inoperative.

With the capacitor 113 charged by the inversion of the comparator 97 as mentioned above, the charge voltage of the capacitor 113 turns the transistor 91 on. This causes discharge of the electric charge of the capacitor 95. As a result, the timer circuit is reset into its initial state.

In the embodiment, mentioned above, the photographer is informed of the approaching end of the timer time by the lighted display of the LED 101 one minute before the end of the timer time. When the LED 101 thus lights up, if the power switch 125 is again closed, a base current flows from the battery 1 to the base of the transistor 91 via the power switch 125, the resistor 127, the diode 146 and the resistor 89. The transistor 91 turns on. The electric charge of the time counting capacitor 95 is discharged to reset the timer circuit (93 and 95) into its initial state. Then, when the power switch 125 is opened by releasing it from the state of being depressed, the base current to the transistor 91 is cut off to turn off the transistor 91. The capacitor 95 then is once again charged and the timer circuit resumes its operation. Therefore, the DC-DC converter continues to operate until the end of the timer time which begins when the operation is performed on the power switch for the purpose of continuing the operation of the flash apparatus. Then, if the power switch 125 is once again operated, the operation of the flash apparatus of course continues further. Therefore, this arrangement minimizes the probability of missing a picture-taking opportunity due to the operation of the flash apparatus being stopped when a flash photograph is desired.

Further, after the power switch 125 is closed to actuate the DC-DC converter together with the timer circuit as mentioned above, if the switch 139 is closed, the capacitor 113 is rapidly charged via the diode 110 up to a predetermined value. Therefore, in that instance, the above-stated operation after the inversion of the output level of the comparator 97 from LL to HL is also performed in the same manner. The DC-DC converter ceases to operate and the power supply to the timer circuit also comes to a stop. The electric charge of the time counting capacitor 95 is discharged. The light of the flashing preparation completion display LED 27 is put out. The discharge tube trigger circuit becomes inoperative.

In accordance with this embodiment, as mentioned in the foregoing, the life of the battery can be lengthened by preventing the electrical energy thereof from being wasted by an inadvertent failure to turn off the power switch. It is another advantage of the embodiment that the photographer can be informed of the approach of the automatic stopping time of the operation of the flash apparatus by means of the light emitting element or a sound producing element. This enables the photographer to have the operation of the timer circuit reset and thus to seize a shutter chance without fail in most cases.

Figure 4:
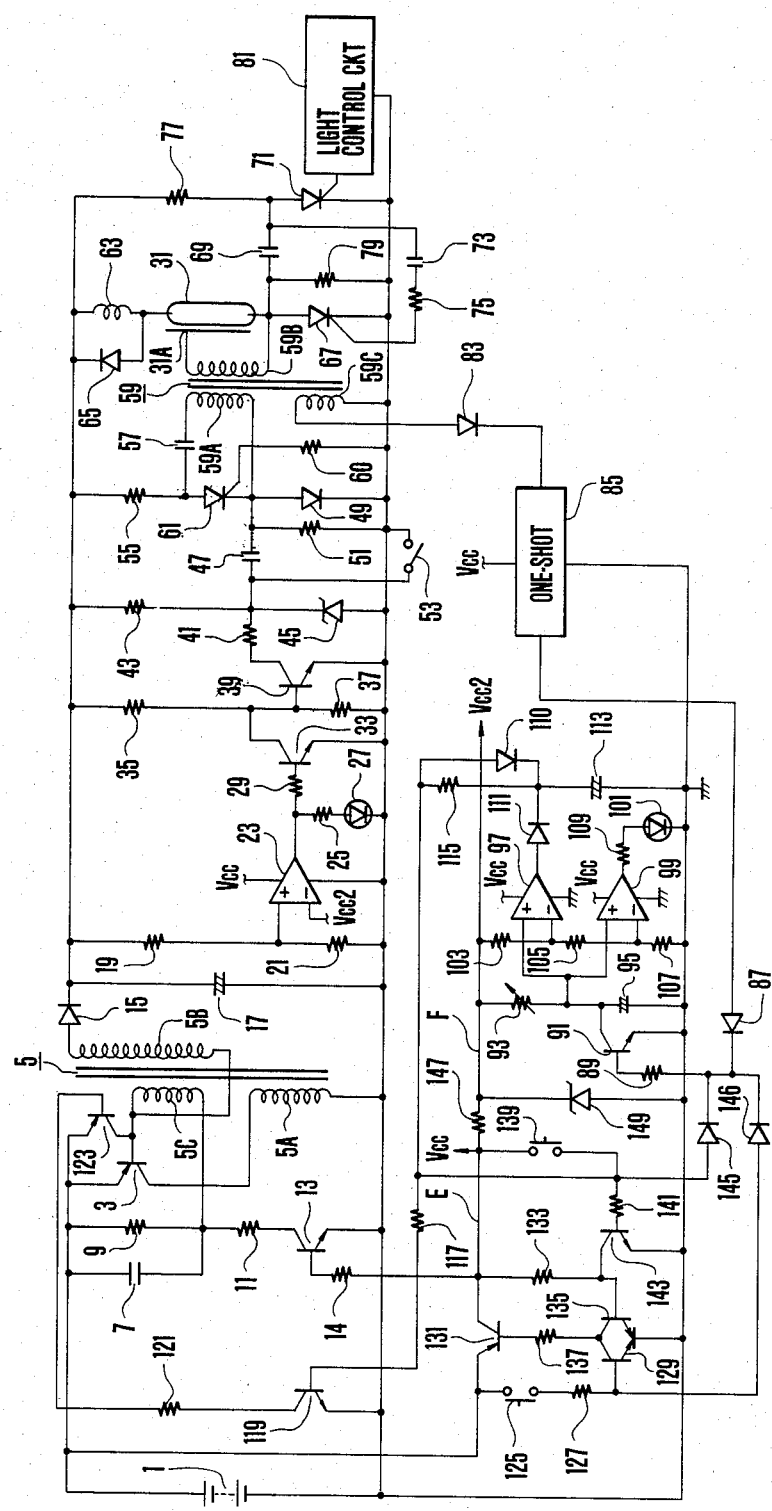
FIG. 4 is a circuit diagram showing a third embodiment of the invention.
Figure 5:
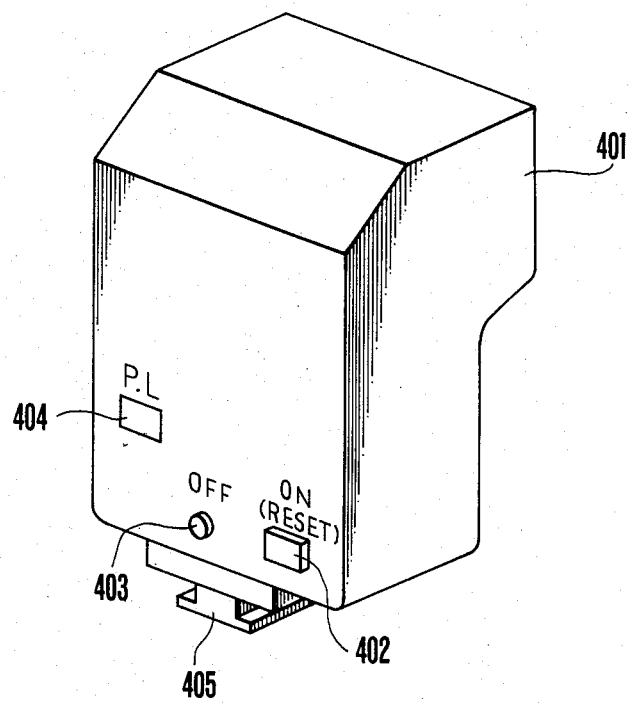
FIGS. 5 and 6 are illustrations showing the details of the embodiment shown in FIG. 4.
Figure 6:
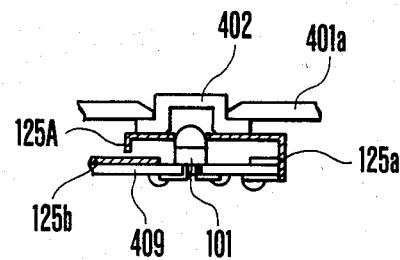

FIGS. 4, 5 and 6 show a flash apparatus as a third embodiment of the invention. The third embodiment is also arranged in almost the same manner as the first embodiment. Therefore, the elements arranged to perform the same functions as those of the corresponding elements of the first embodiment are indicated by the same reference numerals and symbols and the following description is limited to the different points of the embodiment from the preceding embodiments:

FIGS. 5 and 6 show the arrangement of the reset switch 125 and the operation end premonitor lamp 101 shown in FIG. 4. In FIG. 5, the embodiment includes a flash apparatus body 401; a depressing or push-button member 402 which is arranged to close the reset switch 125 disposed on the inner side thereof by being depressed thereon and is formed with a transparent member to permit visual confirmation of a lit state of the LED 101; another depressing or push-button member 403 which is arranged to close a power switch 139 disposed inside by being depressed thereof; an observation window 404 which is arranged to permit visual confirmation of a display by the LED 27 indicating completion of flashing preparation; and a leg part 405 which is arranged to be connected to the accessory shoe of the camera.

FIG. 6 is a sectional view showing the depressing member 402 shown in FIG. 5 and the inside arrangement thereof. The illustration of FIG. 6 includes the casing 401a of the flash apparatus; the contact pieces 125a and 125b of the reset switch 125; and the fore end part 125A of the contact piece 125a which is arranged to come into contact with the other contact piece 125b when the depressing member 402 is depressed. A spring (not shown) urges the contact piece 125a upward so as to prevent it from coming into contact with the other contact piece 125b. The electrical circuit arrangement shown in FIG. 4 is arranged on a printed circuit board 409. An LED 101 which is shown in FIG. 4 is secured to the printed circuit board 409.

The above flash apparatus operates as follows:

When the push-button member 402 is depressed with the flash apparatus, which is arranged as shown in FIGS. 4, 5 and 6, mounted on a camera (not shown), the contact piece 125a comes into contact with the contact piece 125b to close the power switch 125. With the switch 125 closed, the transistor 129 turns on. At the same time, the transistor 131 also turns on. Then, a current flows via the resistor 133 to the base of the transistor 135 to turn the transistor on. After that, even when the power switch 125 is opened by releasing it from the depressed state, the base current of the transistor 131 continues to flow via the resistor 137 and the transistor 135. The transistor 131, therefore, remains on. With the transistor 131 on, a voltage Vcc which is approximately equal to the output voltage of the power source battery 1 is produced to the power supply line E to render thereby the comparator 23, the one-shot 85, etc. operative. The transistor 13 also turns on. This causes the base current of the transistor 3 to flow via the feedback winding 5C of the boosting transistor 5 and the resistor 11. As a result of that, the DC-DC converter which consists of the transistors 3 and 13, the boosting transformer 5, the capacitor 7, the resistors 9 and 11 and the diode 15, begins to oscillate. The main capacitor 17 then begins to be charged. Further, with the transistor 131 turned on, a voltage Vcc2 is produced via the resistor 147 to the power supply line F to cause the timer circuit (93 and 95) to begin its time counting operation.

When the charge voltage of the main capacitor 17 reaches a predetermined value, the output level of the comparator 23 changes to HL. The flash preparation completion display LED 27 lights up. The transistor 33 turns on, the transistor 39 turns off. The trigger capacitor 47 then begins to be charged via the resistor 43. The trigger circuit which consists of the resistors 43, 51 and 55, the Zener diode 45, the capacitor 47 and 57, the thyristor 61, the diode 49 and the transformer 59, becomes operative.

Following that, when the synchronizing switch (not shown) is closed as a result of opening of the shutter (not shown) of the single-lens reflex camera, the above-stated trigger circuit begins to operate. A high voltage is produced at the secondary winding 59B of the trigger transformer 59. The xenon discharge tube 31 is ionized. Meanwhile, a pulse voltage is produced at the auxiliary winding 59C of the trigger transformer to trigger the one-shot 85. With the xenon discharge tube 31 ionized, the known trigger circuit which consists of the capacitor 73 and the resistor 75, turns the thyristor 67 on. The electric charge accumulated at the main capacitor 17 is then discharged via the coil 63, the discharge tube 1 and the thyristor 67. The discharge tube 31 begins to flash to illuminate the object (not shown).

With the object thus illuminated, reflected light coming from the object is measured by the light control circuit 81. When the quantity of the reflected light thus received reaches a predetermined value, the light control circuit 81 produces a flashing stop signal in a known manner. Then, the discharge of the main capacitor is brought to a stop in a known manner to have the film (not shown) exposed to light to an appropriate degree.

When the above-stated pulse voltage is impressed on the input terminal of the one-shot 85, the output of the one-shot 85 is kept at HL for a predetermined period of time. The transistor 91 then short-circuits the time counting capacitor 95 of the timer circuit for a predetermined period of time determined by the output of the one-shot 85. This causes the electric charge accumulator at the capacitor 95 to be discharged thereby to reset the timer circuit into its initial state. After that, when the output level of the one-shot 85 again changes to LL, the transistor 91 turns off to release the capacitor 95 from the shortcircuited state. Then, the timer circuit once again begins to perform a time counting operation. In other words, the timer circuit is reset by the operation of the synchronizing switch 53A or the test switch 53. If the camera is left in that state, the time circuit continues its operation. Then, when the operation reaches a point one minute before the end of the timer time set at the timer circuit (20 minutes as determined in this instance by the variable resistor 93 and the capacitor 95), the output level of the comparator 99 changes to HL. The LED 101 then lights up to inform the photographer of the approaching end of the timer time through the transparent depressing member 402. Following this, when the output level of the comparator 97 changes from LL to HL after the lapse of the timer time, the capacitor 113 is charged via the diode 111. The charge voltage of the capacitor 113 then turns the transistor 119 on. The transistor 123 also turns on. The transistor 3 turns off. The DC-DC converter then stops oscillating. Further, with the capacitor 113 charged as mentioned above, a base current flows to the base of the transistor 143 via the resistors 115 and 141 to turn the transistor 143 on. The transistor 135 turns off. The base current which has been flowing to the base of the power supply transistor 131 is then cut off to turn the transistor 131 off. As a result of that, the collector voltage of the transistor 131 nought nought. This causes the transistor 13 to turn off. Therefore, the DC-DC converter does not resume its oscillation. Therefore, consumption of the power of the battery automatically comes to a stop at this point of time. The power of the battery thus can be saved to avoid being wasted by negligence in turning off the power switch.

Further, with the transistor 131 turned off, power supply to the power supply lines E and F is cut off. Therefore, the light of the LED 101 is put out. Power supply to the comparator 23 is also cut off to extinguish the light of the LED 27. The instant the power supply to the comparator 23 is cut off, the transistor 29 turns off. The transistor 39 turns on to have the electric charge of the capacitor 47 discharged. The trigger circuit for the discharge tube 31 then becomes inoperative.

The inversion of the comparator 97 which takes place as mentioned above causes the capacitor 113 to be charged. Then, the charge voltage of the capacitor 113 turns the transistor 91 on. The electric charge of the capacitor 95 is then discharged to reset the timer circuit into its initial state.

In the embodiment described, the photographer is informed in advance of the approach of the end of the timer time one minutes before the end of the timer time as mentioned above. If in that instance the depressing member 402 is pushed to once again close the power switch 125 when the LED 101 lights up, a base current flows from the battery 1 via the power siwtch 125, the resistor 127, the diode 149 and the resistor 89 to the base of the transistor 91 to turn the transistor 91 on. With the transistor 91 thus turned on, the electric charge of the time counting capacitor 95 is discharged to reset the timer circuit (93 and 95) into its initial state. Following that, when the power switch 125 is opened by releasing it from the depressing operation thereon, the base current flowing to the transistor 91 is cut off to turn the transistor 91 off. The capacitor 95 then once again begins to be charged. The timer circuit thus resumes its operation. With the power switch 125 thus operated for the purpose of continuing the operation of the flash apparatus, therefore, the operation continues until the end of the timer time which begins with the time counting started when the power switch 125 is operated. If the power switch 125 is further operated, the operation of the flash apparatus further continues in the same manner as described above.

After the DC-DC converter is allowed to operate and, at the same time, the timer circuit is allowed to begin to operate with the power switch 125 opened as mentioned above, when the depressing member 403 is pushed to close the switch 139, the capacitor 113 is rapidly charged via the diode 110 up to a predetermined value. Therefore, the above-stated operation which takes place after the change of the output level of the comparator 97 from LL to HL likewise takes place in this instance. The DC-DC converter then ceases to operate. Power supply to the timer circuit comes to a stop. The electric charge of the time counting capacitor 95 is discharged. The light of the flashing preparation completion display LED 26 is put out. The trigger circuit for the discharge tube becomes inoperative.

This embodiment is thus capable of preventing waste of electrical energy which would arise from negligence in turning off the power switch. The life of the battery thus can be lengthened. In the dark such as during the darkness of night, the arrangement to give advance notice of the approaching end of power supply by the light of a lamp enables the photographer to reset the timer circuit by just pushing the lamp part. This saves the photographer the trouble of searching for the location of a reset switch to enable him or her to take a flash photograph without fail. The arrangement to use the advance-notice-giving lamp for illuminating the reset switch as a combined function also contributes to reduction in size and cost of the flash apparatus.

It is an advantageous feature of the invention that the timer circuit can be reset by a manually operable switch which does not participate in a flashing action as it permits extension of the timer time without necessitating any unnecessary photographic operation for that purpose.

What we claim:

1. A flash apparatus comprising:
   (a) a timer circuit having an initial state and arranged to begin to operate when a power switch is closed;
   (b) means for stopping at least the operation of a DC-DC converter in response to expiration of the timer time of said timer circuit;
   (c) manually operable reset means for resetting the operation of said timer circuit into the initial state; and
   (d) advance notice giving means connected to the output terminal of said timer circuit to give a notice of the approaching end of said timer time.

2. An apparatus according to claim 1, wherein said advance notice giving means includes an LED.

3. A flash apparatus comprising:
   (a) light emitting means for producing a flash to illuminate an object to be photographed;
   (b) trigger means connected to said light emitting means for supplying a trigger signal to bring said light emitting means into a light emitting state;
   (c) an electric energy source connected to said light emitting means to supply electric energy to be converted into light energy by said light emitting means;
   (d) a power switch;
   (e) time defining means having an initial state and arranged to begin to operate in response to the operation of said power switch and to produce a control signal for rendering said electric energy source operative for a predetermined period of time;
   (f) manually operable reset means connected to said time defining means to reset the time defining operation of said time defining means into the initial state; and
   (g) reset signal generating means responsive to the trigger signal from said trigger means for generating a reset signal to reset the time defining operation of said time defining means into the initial state.

4. A flash apparatus according to claim 3, wherein said reset signal generating means includes a circuitry functionally coupled with said trigger means for generating the reset signal for a predetermined period of time after the trigger signal is generated.

5. A flash apparatus according to claim 4, wherein said circuitry includes a one-shot.

6. A flash apparatus according to claim 3, wherein said time defining means includes a resistor and a capacitor.

7. A flash apparatus according to claim 6, wherein said reset means includes a switching member connected across the capacitor and a manually operable reset switch connected to said switch member for short-circuiting said switching member during a predetermined interval.

8. A flash apparatus according to claim 7, wherein said power switch and said reset switch are arranged in the form of a common switch.

9. A flash apparatus according to claim 3, wherein said electric energy source has a DC-DC converter connected to a battery.

10. A flash system comprising:
    (a) light emitting means for producing a flash to illuminate an object to be photographed;
    (b) trigger means connected to said light emitting means for supplying a trigger signal to bring said light emitting means into a light emitting state;
    (c) an electric energy source connected to said light emitting means to supply electric energy to be converted into light energy by said light emitting means;
    (d) a power switch;
    (e) time defining means having an initial state and arranged to begin to operate in response to the operation of said power switch and to produce a control signal for rendering said electric energy source operative for a predetermined period of time;
    (f) manually operable reset means connected to said time defining means to reset the time defining operation of said time defining means into the initial state; and
    (g) reset signal generating means functionally connected to said trigger means for generating a reset signal to reset the time defining operation of said time defining means into the initial state in response to generation of said trigger signal.

11. A flash apparatus comprising:
    (a) light emitting means for producing a flash to illuminate an object to be photographed;
    (b) trigger means connected to said light emitting means for supplying a trigger signal to bring said light emitting means into a light emitting state;
    (c) supply means for applying electric energy from a source to said light emitting means to supply electric energy to be converted into light energy by said light emitting means;
    (d) a power switch;
    (e) time defining means having an initial state and arranged to begin to operate in response to the operation of said power switch and to produce a control signal for rendering said supply means operative for a predetermined period of time;
    (f) manually operable reset means connected to said time defining means to reset the time defining operation of said time defining means into the initial state; and
    (g) reset signal generating means response to the trigger signal from said trigger means for generating a reset signal to reset the time defining operation of said time defining means into the initial state.

12. A flash apparatus according to claim 11, wherein said reset signal generating means includes a circuitry functionally coupled with said trigger means for generating the reset signal for a predetermined period of time after the trigger signal is generated.

13. A flash apparatus according to claim 12, wherein said circuitry includes a one-shot.

14. A flash apparatus according to claim 11, wherein said time defining means includes a resistor and a capacitor.

15. A flash apparatus according to claim 14, wherein said reset means includes a switch member connected across the capacitor and a manually operable reset switch connected to said switching member for short-circuiting said switching member during a predetermined interval.

16. A flash apparatus according to claim 15, wherein said power switch and said reset switch are arranged in the form of a common switch.

17. A flash apparatus according to claim 11, wherein said supply means has a DC-DC converter connected to the source.

18. A flash system comprising:
 (a) light emitting means for producing a flash to illuminate an object to be photographed;
 (b) trigger means connected to said light emitting means for supplying a trigger signal to bring said light emitting means into a light emitting state;
 (c) supply means for supplying electric energy from a source to said light emitting means to supply electric energy to be converted into light energy by said light emitting means;
 (d) a power switch;
 (e) time defining means having an initial state and arranged to begin to operate in response to the operation of said power switch and to produce a control signal for rendering said supply means operative for a predetermined period of time;
 (f) manually operable reset means connected to said time defining means to reset the time defining operation of said time defining means into the initial state; and
 (g) reset signal generating means functionally connected to said trigger means for generating a reset signal to reset the time defining operation of said time defining means into the initial state in response to generation of said trigger signal.

19. A flash apparatus comprising:
 (a) a timer circuit having an initial state and arranged to begin to operate in response to closing of a power switch;
 (b) a DC-DC converter
 (c) means for stopping at least the DC-DC converter from operating in response to expiration of the timer time of said timer circuit;
 (d) manually operable reset means for resetting the operation of said timer circuit into the initial state;
 (e) light emitting means connected to the output terminal of said timer circuit to give an advance notice of an approaching end of said timer time; and
 (f) operating means for operating said reset means, said operating means being disposed in front of said light emitting means.

20. An apparatus according to claim 10, wherein said light emitting means includes an LED.

* * * * *